Aug. 13, 1968  IWAO OYA  3,396,903
HERMETICALLY SEALED TYPE MOTOR-COMPRESSOR
FOR REFRIGERATING MACHINE
Filed May 13, 1966  3 Sheets-Sheet 1

INVENTOR.
IWAO OYA
BY
Darby & Darby
ATTORNEYS

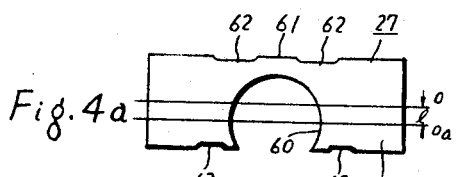
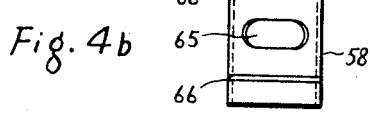
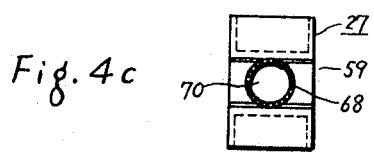
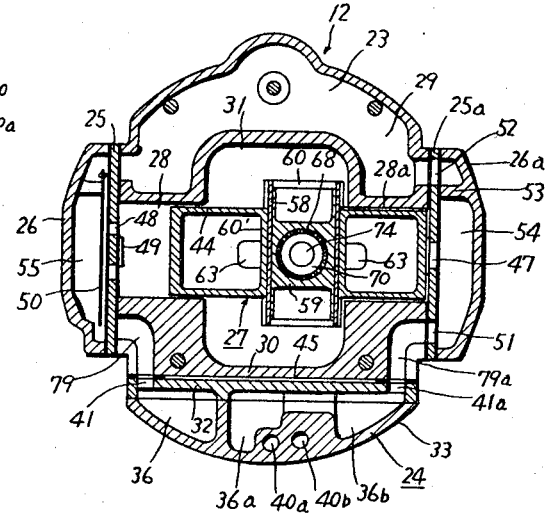
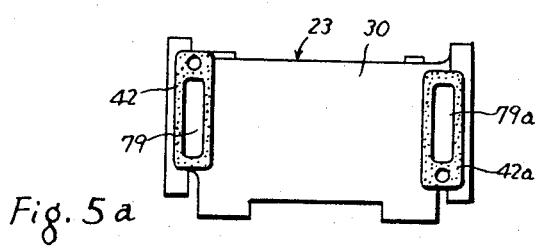
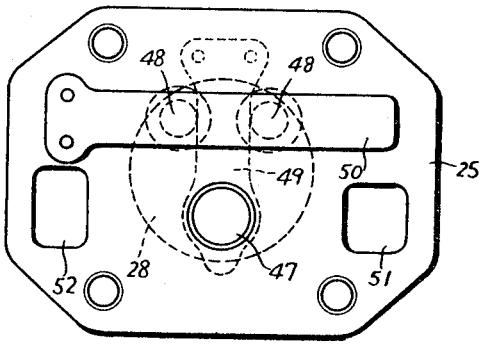
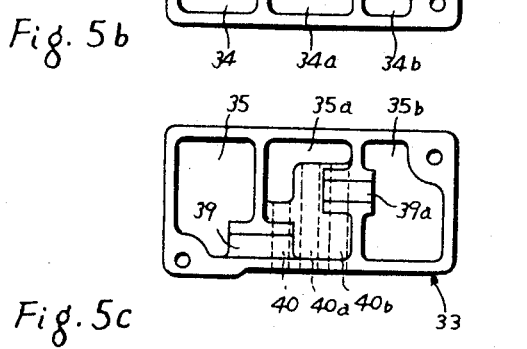

United States Patent Office 3,396,903
Patented Aug. 13, 1968

3,396,903
HERMETICALLY SEALED TYPE MOTOR-COMPRESSOR FOR REFRIGERATING MACHINE
Iwao Oya, Ota-shi, Japan, assignor to Sanyo Electric Co., Ltd., Moriguchi-shi, Japan, and Tokyo Sanyo Electric Co. Ltd., Gunma-ken, Japan, both corporations of Japan
Filed May 13, 1966, Ser. No. 549,977
Claims priority, application Japan, May 19, 1965, 40/40,003; May 27, 1965, 40/31,468; June 4, 1965, 40/33,280; June 7, 1965, 40/46,269; Oct. 26, 1965, 40/87,226
8 Claims. (Cl. 230—58)

ABSTRACT OF THE DISCLOSURE

A hermetically sealed container encloses a motor operated compressor. The compressor comprises a two-headed piston located in a pair of integrally formed mutually opposed cylinders. The motor is connected to operate the piston through an eccentric rod connected to a slide pin located in a slot in the piston.

---

The present invention relates to a hermetically sealed motor-compressor for a refrigerating machine, especially a motor-compressor applicable to window-type air conditioners.

A main object of the present invention is to provide a hermetically sealed motor-compressor for a refrigerating machine consisting in combination of a cylinder block member in which two mutually opposing cylinders and a muffler are formed in one unity, and a cylindrical piston which makes a reciprocal motion within said two cylinders.

Another object of the present invention is to provide a hermetically sealed motor-compressor for a refrigerating machine which is provided with a novel lubricating device for supplying a lubricating oil to sliding faces of a cylinder block member in which two mutually opposing cylinders and a muffler are formed in one unity and a cylindrical piston which makes a reciprocal motion within said two cylinders.

Still another object of the present invention is to provide a hermetically sealed motor-compressor for a refrigerating machine consisting in combination of a cylinder block member in which two mutually opposing cylinders and an outlet muffler are formed in one unity, a cylindrical piston which makes a reciprocal motion within said two cylinders, and a suction muffler which is adiabatically disposed at a position opposing said outlet muffler of said cylinder block member.

Still further objects and features of the present invention will be more clearly understood from the explanations hereinafter made with respect to examples of embodiment of the invention referring to drawings, wherein:

FIGURE 3 is a sectional diagram taken along the line 3—3 of FIGURE 1.

FIGURE 4a to FIGURE 4c are diagram elements of a piston assembly of said example of embodiment.

FIGURES 5a to 5c are diagrams of a side view of suction side of a cylinder assembly and two elements of a suction muffler.

Figure 6A:
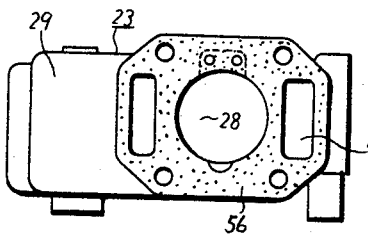
Figure 6D:
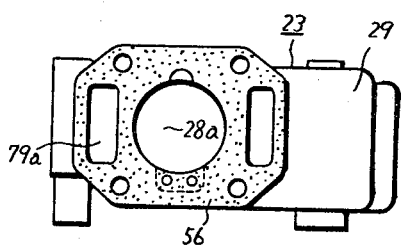
Figure 6B:
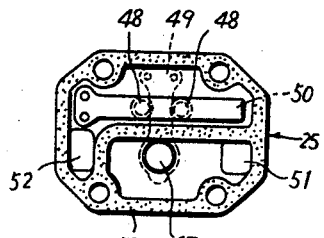
Figure 6E:
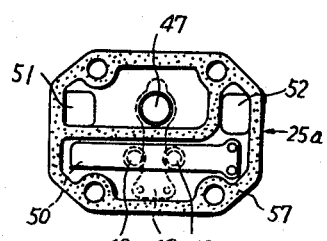
Figure 6C:
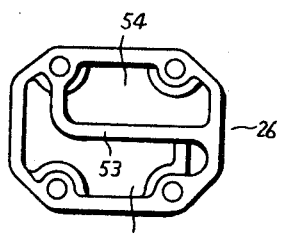
Figure 6F:
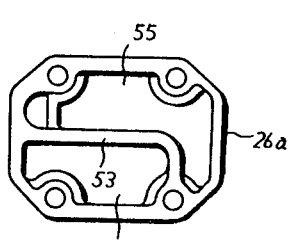

FIGURES 6a to 6c are diagrams of one end face of a cylinder assembly, a valve sheet and a gasket which are tightly attached to said end face, and a cylinder head which is tightly attached to said gasket, and FIGURES 6d to 6f are diagrams of other end faces of said cylinder assembly, a valve sheet and a gasket which are tightly attached to said end face, and a cylinder head which is tightly attached to said gasket.

FIGURE 7 is a diagram which is similar to FIGURE 6b, but herein a valve sheet only is shown having the gasket removed.

Figure 1:
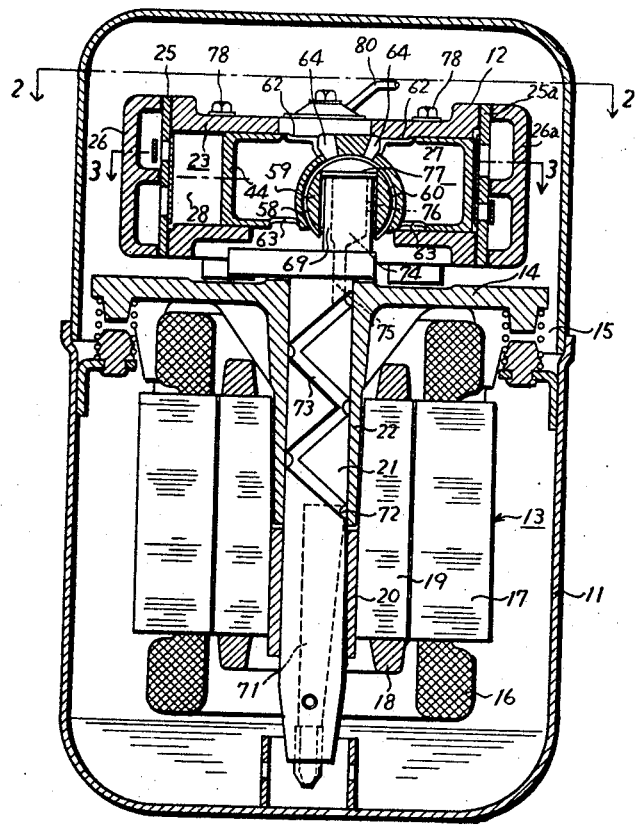
FIGURE 1 is a vertical sectional diagram of a hermetically sealed motor-compressor for a refrigerating machine in which the present invention is embodied taken along the line 1—1 of FIGURE 2.

Now, referring to FIGURE 1, the hermetically sealed motor-compressor for a refrigerating machine in accordance with the present invention has a hermetically sealed container 11 in the interior of which a frame member 14 is resiliently mounted by coil spring 15 to a bracket for supporting a compressor mechanism 12 at its upper face and a motor mechanism 13 at its lower face. The motor mechanism 13 is a normal induction motor which comprises a stator 17 on which a stator coil 16 is wound, a rotor 19 having a rotor conductor 18, and a rotary shaft 21 which is inserted into said rotor through a rotor bush 20. Said stator 17 is fixed with a bolt (not shown) to the periphery of the lower face of the frame member 14, and said rotary shaft 21 is rotatably received by a bearing portion 22 which extends downwardly at the center of the frame member 14.

Figure 2:
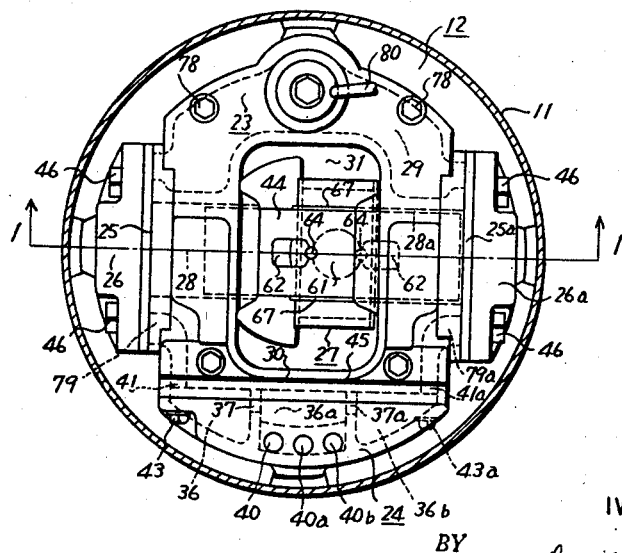
FIGURE 2 is a sectional diagram taken along the line 2—2 of FIGURE 1.

Referring to FIGURES 1, 2 and 3, the compressor mechanism 12 comprises a unitary assemblage of mainly a cylinder block member 23, a suction muffler 24, valve sheets 25, 25a, and cylinder heads 26, 26a which are fixed to the upper face of the frame member 14, and a piston assembly 27 which is movably combined with said cylinder block member 23.

The cylinder block member 23 has two mutually opposing cylinders 28, 28a, a common outlet muffler 29 which is located at one side of an axle connecting said two cylinders, and a connecting portion 30 which is located at the other side of said axle, and these are so casted in one unity that a space portion 31 is formed at the center. As is shown in FIGURE 5, a suction muffler 24 comprises a thin plate body 32 and an arcuate member 33. Plate 32 and arcuated member 33 each have three recess hollowed portions 34, 34a, 34b, and 35, 35a, 35b respectively. The combination of plate 32 and member 33 forms small muffler chambers 36, 36a, 36b. Plate 32 and member 33 are respectively provided with grooves 38, 38a and 39, 39a in order to form communicating holes 37, 37a for mutually connecting said small chambers. Three suction holes 40, 40a, 40b opening in the central recess hollowed portion 35a of said arcuate member 33 are provided, and through holes 41, 41a are provided in right and left recess hollowed portions 34, 34b adjacent to the ends of the plate 32. The suction muffler having such structure as the above-mentioned is mounted with bolts 43, 43a to a side face of a connecting portion 30 of the cylinder block member 23 having gaskets 42, 42a interposed therebetween. A gap 45 is provided between the plate 32 of the suction muffler 24 and the connecting portion 30 of the cylinder block member 23 so that transfer of heat from a compressed coolant which has become heated by being adiabatically compressed by a piston 44 in the cylinders 28, 28a is minimized.

Referring to FIGURES 6 and 7, both valve sheets 25, 25a and cylinder heads 26, 26a are mounted with bolts 46 to outer side opening ends of the cylinders 28, 28a. Each of the valve sheets 25, 25a is provided with an inlet port 47 and two outlet ports 48 at its generally central portion. A tongue-type inlet valve 49 for opening and closing the inlet port 47 is disposed in vertical direction mounted on the inside of each valve sheet. Mounted on the inside of each of said valve sheets 25, 25a, a reed-type outlet valve 50 is disposed in horizontal direction to open and close two outlet ports 48. In each valve sheet 25, 25a there are provided through holes 51, 52. Each of the cylinder heads 26, 26a has a generally rectangular inlet muffler chamber 54 and a generally L-shaped outlet muffler chamber 55 which are partitioned by a L-shaped partitioning wall 53. The inlet muffler chamber 54 provides a passage between the through hole 51 and the inlet port 47, and the outlet muffler chamber 55 provides a passage between the outlet ports 48, 48 and the through hole 52. Gasket 56 is inserted between the outer side opening end of the cylinder 28 and the valve sheet 25, and gasket 57 is inserted between the valve sheet 25 and the cylinder head 26.

With respect to the piston assembly 27, reference is made to FIGURES 1, 2, 3 and 4. The piston assembly 27 comprises a cylindrical piston 44, a cylindrical cross slide 58 and a cylindrical slide pin 59. The cylindrical piston 44 has two closed end faces, and is provided with a cylindrical channel or circular hole 60 having a partially cut off periphery. The center of circular hole 60 is perpendicular to an axis Oa which is eccentric from the central axis O of piston 44 as shown in FIG. 4a. The eccentricity of the eccentric axis Oa from the central axis O is from ⅙ to ¼ of the outer diameter of the piston, and the inner diameter of the circular hole 60 is preferably from 0.8 to 1.0 of the outer diameter of the piston. Thus, the right hand side portion and the left hand side portion of the piston 44 having said circular hole 60 opened in the middle are connected in one unity by a periphery portion 61 opposite to the eccentric axis Oa as most clearly shown in FIG. 4a. Without excessively decreasing the mechanical strength of the piston, the structure permits the use of a centerless grinder having a good processing efficiency and which provides a high precision of the cylinder face. Further, in order to reduce the weight the piston 44 is casted hollow. In order to reduce abrasion due to the contact with cylinders 28, 28a and to facilitate the removal of mould cores, mould core removing holes 62, 62, 63, 63 are respectively provided in the upper and lower parts of both sides of a cylindrical wall 60a which forms the circular hole 60, and through holes 64, 64 connecting said periphery portion 61 and the circular hole 60 are provided. The through holes 64, 64 are communicating in part to said holes 62, 62 forming passageways of a lubricating oil as will be explained later. The sleeve or cross slide 58 is a cylindrical body so that it can be inserted into the circular hole 60 of the piston 44. It has two opposing window holes 65, 65 shown in FIG. 4b for cooperation with holes 64, 64 and eccentric pin 69. After the cross slide 58 is inserted into the circular hole 60, engaging rings 67, 67 are fitted to the annular grooves 66, 66 so that the cross slide is fixed to the piston 44. The slide pin 59 is a cylindrical body which is slidably inserted into said cross slide 58, and it is provided with a circular hole 70 at the center portion thereof to receive an eccentric rod 69 which extends upwardly from the upper end of the rotary shaft 21.

As the circular hole 60 of the piston 44 is eccentrically provided the contacting area of the circular hole 70 of the slide pin 59 and the eccentric rod 69 is naturally small, it results in that the allowable load is small, and durability can not be assured if a normal sliding frictional bearing system is employed. Accordingly, in accordance with the present invention, a needle-roller-bearing 68 is mounted to the inner wall of the circular hole 70 of the slide pin 59 so that allowable bearing load is large and the wall thickness of the bearing portion can be made smaller. It has been found that the allowable load in accordance with the present invention is four to fives times that of the sliding frictional bearing system. It will be apparent that the width of the cut off of the circular hole 60 of the piston 44 and the width of the window hole 65 of the cross slide 58 are larger than the diameter of the eccentric rod 69 as a matter of course.

The lubricating device will now be explained. The rotary shaft 21 has a conduit 71 extending from the lower end thereof to generally central portion. Said conduit expands upwardly in eccentric relation to the axis of shaft 21. Hole 72 which opens to the periphery face of the rotary shaft 21 is provided at the upper end of conduit 71. The rotary shaft 21 is further provided with a helical groove 73 which extends from the center portion upwardly. The lower end of the groove 73 is communicating to the hole 72, and the upper end thereof is communicating through a vertical hole 75 to a recess 74 which is provided concentrically in the eccentric rod 69 which is disposed at the upper end of the rotary shaft 21. With the abovementioned structure, the lubricating oil stored at the lower portion of the hermetically sealed container 11 rises up along the tapered portion of the conduit 71 due to the centrifugal force produced by the rotation of the rotary shaft 21, goes through the helical groove 73 and lubricates the contacting faces of the bearing portion 22 of the frame member 14 and the rotary shaft 21. The lubricating oil brought up through the helical groove 73 comes into the recess 74 of the eccentric rod 69, a part thereof goes through a lateral hole 76 provided in the eccentric rod 69 to lubricate the contacting faces of the slide pin 59 and the eccentric rod 69, and then comes down along the surface of the eccentric rod 69. The lubricating oil stored in the recess 74 of the eccentric rod 69 further goes to a space 77 above the eccentric rod 69 which is formed by the eccentric rod 69, the slide pin 59, the cross slide 58 and the piston 44, and a part thereof lubricates the contacting faces of the cross slide 58 and the slide pin 59. Most of the remaining portion of the lubricating oil goes through through holes 64, 64 provided in the piston 44 (inclining diagonally in the drawings) due to the centrifugal force produced by the rotation of the eccentric rod 69, and lubricates the sliding faces of the cylinders 28, 28a and the piston 44 scattering over the periphery face of the piston 44. Then, said lubricating oil falls down onto the upper face of the frame member 14 to cool the frame member 14, then falls down back to the lower portion of the hermetically sealed container 11 again.

The advantage of the hermetically sealed motor-compressor for refrigerating machine in accordance with the present invention will be explained hereinafter in connection with assembling processes.

The motor mechanism 13 is so assembled that first the rotary shaft 21 is inserted into the bearing portion 22 of the frame member 14, then the rotor 19 is pressedly fitted thereonto from the lower direction via the rotor bush 20, and then the stator 17 having the stator coil 16 wound thereon is fixed to the lower face of the frame member 14 with bolts.

On the other hand, the compressor mechanism 12 is so assembled that the inlet muffler 24 formed of a combination of the plate 32 and the arcuate member 33 is mounted with bolts 43, 43a having gaskets 42, 42a interposed to connecting portion 30 of cylinder block member 23, and the piston 44 is inserted from one of the cylinders 28, 28a. Then the piston 44 is rotated around the central axis O so that the circular hole 60 of the piston 44 opens downwardly within the central space 31 of the cylinder block member 23, the cross slide 58 is fitted to the circular hole 60, the engaging rings 67, 67 are made to engage with the grooves 66, 66 at the periphery face of the cross slide 58 so that the cross slide is secured, then the slide pin 59 is slidably inserted into the cross slide 58.

Then, the eccentric rod 69 provided at the upper end of the motor rotary shaft 21 is inserted into the circular hole 70 of the slide pin 59 of the cylinder block member 23 is mounted to the upper face of the frame member 14 with bolts 78 while the positions of two ends of the piston 44 are adjusted.

At the time of mounting valve sheets 25, 25a and cylinder heads 26, 26a to the outer side opening ends of two cylinders 28, 28a, the inlet muffler chamber 54 and the outlet muffler chamber 55 in the cylinder head 26 and the cylinder head 26a must be arranged so as to communicate properly with the inlet muffler 24 which is common to both cylinders and the outlet muffler 29 which is also common to both cylinders and which are arranged at two sides of the cylinders 28, 28a. In accordance with the present invention, the number of different parts is reduced by making the contours of the valve sheets 25, 25a and the cylinder heads 26, 26a the same respectively. Valve sheet 25a and the cylinder head 26a which are mounted at the outer end of cylinder 28a are turned by 180° relative of the valve sheet 25 and the cylinder head 26 which are mounted at the outer end of cylinder 28.

In the hermetically sealed motor-compressor assembled as above explained, the piston 44 is made to do a reciprocal motion within the cylinders 28, 28a by the rotary shaft 21 which is rotated by the motor mechanism 13. When piston 44 moves leftward in cylinders 28, 28a, the low pressure coolant in the internal space of the hermetically sealed container 11 goes through the muffler small chamber 36a, the communicating hole 37a and the small chamber 36b. From the communicating hole 79a provided in the connecting portion 30 of the cylinder 28a through the through hole 51 of the valve sheet 25a it goes into the inlet muffler chamber 54 of the cylinder head 26a, and by the opening of the inlet valve 49 it goes through the inlet hole 47 of the valve sheet 25a to be sucked into the cylinder 28a of the right hand side. The movement of the piston 44 to the left hand side adiabatically compresses the low pressure coolant sucked into the left cylinder 28. The high temperature coolant is compressed to a predetermined pressure, opens the outlet valve 50, shoots through the outlet holes 48, 48 of the valve sheets 25 into the outlet muffler chamber 55 of the cylinder head 26, goes into the outlet muffer 29 through the through hole 52 of the valve sheet 25, wherein the pulsating component of the coolant is sufficiently muffled and absorbed. The coolant is let out of the hermetically sealed container 11 through an outlet tube 80 which is partially shown in FIGURE 1. Then, when the piston 44 moves rightwardly within the cylinders 28, 28a the low pressure coolant is sucked into the left side cylinder 28 from the left side cylinder head 26 through the left side passageway of the inlet muffler 24. The adiabatically compressed high temperature coolant in the right side cylinder 28a goes from the right side cylinder head 26a toward the outlet muffler 29. For the purpose that the low pressure coolant does not decrease the compression efficiency of the compressor and the transfer of heat from the coolant which has become heated due to adiabatic compression is prevented, the inlet muffler 24 is adiabatically mounted to the cylinder block member 23 so that the coolant is prevented from being heated during the suction process.

The compressor in accordance with the present invention having such structure as the abovementioned utilizes most effectively the internal space of the hermetically sealed container 11 because of such arrangement that the compressor mechanism 12 is disposed above the motor mechanism, and the cylinder block member 23, the inlet muffler 24, the valve sheets 25, 25a and the cylinder heads 26, 26a are arranged generally circularly in order to coincide with the sectional contour of the hermetically sealed container 11. Further, due to the provision of two cylinders 28, 28a mutually opposingly in the cylinder block member 23 the center lines of the two cylinders 28, 28a can be made to coincide easily, and by forming the piston 44 which makes reciprocal motion with the cylinders 28, 28a from one cylindrical body the mechanical processing of these components can be made easily with alowable error range of the fitting therebetween.

The coupling of the piston assembly 27 in the case that the eccentricity of the eccentric rod 69 is small it is possible to directly insert the slide pin 59 into the circular hole 60 of the piston 44 to make it slide therein without providing the cross slide 58.

What is claimed is:

1. A hermetically sealed motor-compressor comprising:
 a hermetically sealed container;
 a motor mechanism resiliently supported in said container, said motor having a rotary drive shaft and an eccentric rod mounted at one end of said rotary shaft; and
 a compressor mechanism resiliently supported in said container, said compressor mechanism including:
 a pair of integrallly formed mutually opposed cylinders;
 a two-headed piston disposed within said cylinders, said piston having a uniform circular cross-section and a channel near its center, the axis of said channel being perpendicular to a line parallel to and spaced from the axis of said piston;
 a slide pin reciprocably mounted within said channel, said slide pin having a recess for receiving said eccentric rod, whereby said piston of said compressor mechanism is driven by said motor mechanism.

2. A hermetically sealed motor-compressor of the type described in claim 1, wherein said slide pin is reciprocably mounted within said channel by means of
 a sleeve having a window hole in one side thereof, said sleeve being mounted in said channel and said slide pin being reciprocably carried within said sleeve, said recess in said slide pin being aligned with said window hole in said sleeve in order to receive said eccentric rod the length of said sleeve being greater than the diameter of said piston.

3. A motor-compressor of the type described in claim 1, wherein said channel in said piston member is of circular cross-section.

4. A motor-compressor of the type described in claim 1, wherein said slide pin is of circular cross-section.

5. A hermetically sealed motor-compressor of the type described in claim 1, wherein a needle bearing is interposed between said recess in said slide pin and said eccentric rod.

6. A hermetically sealed motor-compressor comprising:
 a hermetically sealed container;
 a motor mechanism resiliently supported in said container, said motor having a rotary drive shaft and an eccentric rod mounted at one end of said rotary shaft; and
 a compressor mechanism resiliently supported in said container, said compressor mechanism including:
 a pair of mutually opposed cylinders;
 a two-headed piston disposed within said cylinders, said piston having a channel near its center, the axis of said channel being transverse to the axis of said piston;
 a slide pin reciprocably mounted within said channel, said slide pin having a recess for receiving said eccentric rod, whereby said piston of said compressor mechanism is driven by said motor mechanism;
 an inlet muffler mounted at one side of said pair of mutually opposed cylinders, said inlet muffler having a pair of openings, one opening adjacent the open end of each of said cylinders;
 an outlet muffler mounted at the opposite side of said pair of mutually opposed cylinders, said outlet muffler having a pair of openings, one opening adjacent the open end of each of said cylinders;
 a pair of valve sheets having the same contours, one valve sheet mounted on the open end of each of said cylinders, each valvee sheet having an inlet valve and an outlet valve; and
 a pair of cylinder heads having the same contours, each cylinder head being mounted on the corresponding valve sheet at the open end of each of said cylinders so as to connect the outlet valve of said valve sheet with the corresponding outlet muffler opening, and to connect the inlet valve of said valve sheet with the corresponding inlet muffler opening.

7. A hermetically sealed motor-compressor of the type described in claim 6, wherein said inlet muffler is insulated from said cylinders.

8. A hermetically sealed motor compressor of the type described in claim 1 further comprising a pair of passages formed in said piston and extending diagonally outward from said channel to the exterior surface of said piston for communicating lubricating fluid from said channel to said exterior surface in response to the reciprocating motion of said piston.

References Cited

UNITED STATES PATENTS

| 1,974,421 | 9/1934 | Haunz | 230—58 XR |
| 2,435,108 | 1/1948 | Touborg | 230—58 |

ROBERT M. WALKER, *Primary Examiner.*